United States Patent [19]

Walles

[11] 4,220,739

[45] Sep. 2, 1980

[54] METHOD FOR SULFONATING ORGANIC MATERIALS

[75] Inventor: Wilhelm E. Walles, Midland, Mich.

[73] Assignee: The Dow Chemical Company, Midland, Mich.

[21] Appl. No.: 928,666

[22] Filed: Jul. 28, 1978

[51] Int. Cl.$^2$ ............................. C08F 8/34; C08F 8/36
[52] U.S. Cl. ................................. 525/344; 260/505 S; 260/504 R; 260/513 T; 525/420; 525/422; 525/437; 525/452; 525/461; 525/474; 525/505; 525/513; 525/523; 525/535
[58] Field of Search ................... 526/31; 525/344, 535, 525/523, 505, 513, 474, 452, 422, 420, 437, 461; 260/505 S, 504 R, 513 T

[56] References Cited

U.S. PATENT DOCUMENTS

| | | | |
|---|---|---|---|
| 3,218,301 | 11/1965 | Moody et al. | 526/31 |
| 3,228,744 | 1/1966 | Karn | 526/31 |
| 3,542,746 | 11/1970 | Eckardt et al. | 526/31 |
| 3,624,054 | 11/1971 | Barton et al. | 526/31 |
| 3,629,025 | 12/1971 | Walles | 526/31 |

*Primary Examiner*—William F. Hamrock

[57] ABSTRACT

Organic materials such as polyethylene, polystyrene and polypropylene are more efficiently sulfonated by contacting them with an essentially dry gaseous mixture of sulfur trioxide and chlorine. Sulfonated organic polymers prepared by this process are adhesive, antistatic and highly impermeable to oleophilic materials such as gasoline, and common hydrocarbon solvents.

11 Claims, No Drawings

METHOD FOR SULFONATING ORGANIC MATERIALS

BACKGROUND OF THE INVENTION

This invention relates to processes for sulfonating organic materials such as relatively high molecular weight organic polymers and lower molecular weight organic compounds.

The use of organic polymers in the fabrication of shaped articles such as filaments, fibers, films, sheets, and closure members, such as bottles, tanks and other containers, and other molded articles is well known. Unfortunately, articles of most organic polymers, particularly predominantly hydrocabon polymers, are non-electroconductive, are nonadherent to polar materials such as inks, paints, dyes and various polar adhesives and are readily permeated by olephilic materials such as liquid and gaseous hydrocarbons and the like. As a result of the foregoing deficiencies, many of such organic polymers must be treated with various agents which impart varying degrees of electroconductivity, adhesivity and impermeability to oleophilic materials. Of such treatment techniques, those involving surface sulfonation of the polymer offer many advantages from the standpoint of economy and versatility.

Exemplary prior art techniques for sulfonating polymers are described in the following patents: U.S. Pat. Nos. 2,400,720; 2,937,066; 2,786,780; 2,832,696; 3,613,957 and 3,740,258.

In addition, the use of sulfonated organic compounds such as the alkylbenzene sulfonates and the like as surfactants and detergents is also well known. Such organic compounds are similarly sulfonated usually by contacting the organic compound with a sulfonating agent such as sulfuric acid or sulfur trioxide.

As a general rule, most of the prior art techniques for the sulfonation of organic materials, particularly organic polymers, require relatively long reaction times. Accordingly, it would be highly desirable to provide a process for sulfonating organic materials wherein such reaction times are significantly reduced without deleteriously affecting the desirable properties of the sulfonated materials.

SUMMARY OF THE INVENTION

The present invention is such a more efficient process for sulfonating organic compounds, particularly organic polymers. In this process, a sulfonatable organic compound such as a normally solid organic polymer or a simple organic compound is contacted with an essentially dry, gaseous mixture comprising sulfur trioxide and suitably active halogen. The amount of sulfur trioxide is sufficient to provide the desired degree of sulfonation. The amount of halogen employed is sufficient to accelerate the rate of sulfonation by at least 10 percent relative to the rate of sulfonation achieved by using sulfur trioxide in the absence of halogen.

Surprisingly, the presence of the halogen with the sulfur trioxide during the sulfonation reaction greatly accelerates the rate of sulfonation without deleteriously affecting the sulfonated organic material. It is also found that the combination of sulfur trioxide and halogen often increases the rate of halogenation of the organic compound, although such halogenation is merely an optional benefit and not essential for the practice of the present invention. As a result of the improved rates of sulfonation, polymeric containers being sulfonated to render them impermeable to hydrocarbons can be produced in times which are less than $\frac{1}{2}$ to $\frac{2}{3}$ of the times required to sulfonate the same containers in the absence of the halogen.

Accordingly, the resulting sulfonated organic polymers produced in the practice of the present invention exhibit improved antistatic properties, adhesion to a wide variety of polar materials such as dyes, paints and inks, improved receptivity to metal coatings and impermeability to oleophilic materials and low molecular weight gases such as oxygen and carbon dioxide. Such surface sulfonated polymers are useful as substrates for painting and metal coating and are also useful as enclosure members for containing hydrocarbons such as gasoline and the like. Exemplary uses include containers such as gasoline and other fuel tanks, fuel barrels and drums, oleaginous food containers such as bags, tubs and cartons; fibrous materials for use in carpets and clothing and other fabric; plastic substrates and metal-clad plastics such as capacitors, auto parts and the like; plastic substrates for use in electrostatic spray painting and the like.

Simple organic compounds which are sulfonated by the method of this invention are useful as washing detergents, surfactants and the like.

DETAILED DESCRIPTION OF THE ILLUSTRATIVE EMBODIMENTS

For the practice of the preferred embodiments of this invention, the organic compound is an organic polymer which includes any sulfonatable, solid or foamed, organic polymer. Sulfonatable polymers have hydrogen atoms bonded to the carbon atoms which are replaceable by sulfonic acid groups. Thus, polytetrafluoroethylene is not a sulfonatable organic polymer since it does not have any replaceable hydrogen atoms and is therefore not sulfonatable.

Exemplary suitable organic polymers are thermosetting plastics such as epoxy resins, phenol formaldehyde resins, urea-formaldehyde resins, silicones, polyurethanes and the like. Suitable organic polymers are also thermoplastic polymers including addition-type homopolymers and copolymers and blends thereof prepared from the aliphatic alpha-monoolefins, aliphatic conjugated and nonconjugated dienes, trienes and polyenes, halogenated aliphatic olefins, alpha-beta-ethylenically unsaturated carboxylic acids, vinyl esters of nonpolymerizable carboxylic acids, alkyl esters of alpha-beta-ethylenically unsaturated carboxylic acids, monovinylidene aromatic monomers, alpha-beta-ethylenically unsaturated nitriles and amides, ethylenically unsaturated ethers and ketones and other ethylenically unsaturated monomers which polymerize across the ethylenic bond to form polymers having linear carbon to carbon backbone molecular structure with a plurality of free hydrogen atoms attached to the chain and/or attached to carbon atoms of the substituents of the chain. Also included as suitable organic polymers are the thermoplastic condensation-type polymers exemplified by the polyamides such as nylon, the polyimides, the polyesters such as polyethylene terephthalate, the polycarbonates derived from dihydric phenols such as bisphenol A, the polyethers and the like. Organic polymers of special interest are the thermoplastic addition homopolymer, copolymers and mixture of polymers of the following monomers: the aliphatic monoolefins such as ethylene propylene, butene-1 and isobutylene; aliphatic conjugated dienes such as butadiene; monovinylidene aromatic monomers such as styrene and α,β-ethylenically unsaturated nitriles such as acrylonitrile.

Prior to effecting sulfonation of organic polymers in accordance with the process of the present invention, it is desirable to fabricate the organic polymer in conventional manner into the form of the desired article. Before or during such fabrication, the organic polymers can be mixed with conventional additives for the polymers such as antioxidants, fillers, pigments, dyes, extenders, plasticizers and the like without impairing the subsequent sulfonation treatment. It should be understood, however, that particulate forms of the organic polymer or other suitable organic compound may be employed in the sulfonation process of the present invention.

In addition to the aforementioned organic polymers, other organic compounds such as simple organic compounds having hydrogen atoms bonded to carbon atoms which are replaceable by sulfonic acid groups are also suitably employed in the practice of this invention. Examples of such compounds include alkylarenes such as linear and branched alkyl benzenes wherein alkyl has from 8 to 18 carbon atoms, e.g., dodecylbenzene, decylbenzene, tetradecylbenzene and the like; alkanes having from 8 to 20 carbons; and other hydrocarbons.

In the practice of the sulfonation process, sulfonation of the organic material is effected by a vapor phase process employing gaseous sulfur trioxide and a suitably active halogen such as fluorine, bromine, chlorine or mixtures thereof which inherently form interhalogen compounds such as ClF and BrCl. Preferably, a gaseous halogen such as chlorine is employed. While the gaseous phase reactants can consist entirely of sulfur trioxide and the halogen, it is generally preferred to dilute them with an inert gas such as air, nitrogen, helium, carbon dioxide and the like. The concentration of sulfur trioxide in the gaseous reactant mixture is suitably that amount which will provide a degree of surface sulfonation of an organic polymer in the range from about 0.001 to about 50 milligrams of sulfur trioxide equivalents in the form of sulfonic acid groups per square centimeter of surface, preferably from about 0.06 to about 10 milligrams per square centimeter. While it is found that 0.001 milligram of sulfur trioxide equivalents per square centimeter provides the surface of the organic polymer with antistatic properties and satisfactory adhesion, it is found that at least 0.015 milligram of sulfur trioxide equivalent per square centimeter, preferably at least about 0.06 milligram per square centimeter, is required to provide desirable impermeability to oleophilic materials. Generally, concentrations of sulfur trioxide that will produce such degrees of sulfonation vary from about 0.1 to about 50 volume percent of sulfur trioxide based on total volume of gaseous reactants, preferably from about 2 to about 25, most preferably from about 5 to about 20, volume percent of sulfur trioxide in the dry mixture. The foregoing volume concentrations correspond to about 0.003 to about 3 grams of sulfur trioxide per liter (at atmospheric pressure) for the range of 0.1 to 100 volume percent and about 0.45 to about 0.75 gram of sulfur trioxide per liter for the range of 15 to 25 volume percent.

The amount of halogen employed is suitably that which will accelerate the sulfonation reaction such that the time of sulfonation is only 90 percent, preferably from about 50 to about 75 percent, of that required to provide the same degree of sulfonation in the presence of the same concentration of sulfur trioxide in absence of halogen. Preferred acceleration of the sulfonation reaction is achieved by employing from about 0.1 to about 10, most preferably from about 4 to about 8, moles of halogen per mole of sulfur trioxide. Such relative proportions of halogen correspond to concentrations from about 0.1 to about 99, preferably from about 8 to about 98, most preferably from about 20 to about 80, volume percent of halogen in the dry mixture.

Time of reaction required to produce an acceptable degree of sulfonation varies with the organic material being sulfonated, the concentration of sulfur trioxide and halogen and the temperature. For example, at room temperature (25° C.), a gaseous phase reactant mixture containing 8.2 volume percent of sulfur trioxide, 63.1 volume percent of chlorine and 28.7 volume percent of nitrogen or dry air (62 mm $SO_3$+480 mm $Cl_2$+218 mm $N_2$ or air) requires about 2 minutes to sulfonate high density polyethylene to a degree of 2 milligrams $SO_3/cm^2$, about 4 minutes to provide a degree of 3.3 milligrams $SO_3/cm^2$ and about 6 minutes to provide a degree of 4.2 milligrams $SO_3/cm^2$. At higher temperatures, treatment times and/or sulfur trioxide/halogen concentration may be reduced to achieve the same degree of sulfonation. Although temperature is not particularly critical in the practice of the method of this invention, it is generally advantageous to employ reaction temperatures in the range from about 10 to about 50° C., preferably from about 15° to about 30° C. The pressure at which the process of this invention can be carried out is suitably in the range from subatmospheric to superatmospheric. For convenience, it is preferred to carry out the reaction at atmospheric pressure.

In addition to the foregoing requirements, it is generally preferred to exclude water vapor from the gaseous reactant mixture by conventional means, e.g., a conventional dryer tube, since the sulfur trioxide will react with water in liquid or vapor form to form droplets of sulfuric acid of varying concentration thereby inhibiting or preventing uniform sulfonation of the organic material. Normally, it is desirable to maintain the concentration of water in the reaction medium at a level less than 0.01 volume percent based on the volume of the gaseous mixture of reactants, preferably less than about 0.001 volume percent.

In addition to the aforementioned sulfonation reaction, the combined presence of sulfur trioxide and halogen in the gaseous mixture of reactants facilitates a halogenation reaction with the organic material even in the absence of ultraviolet light. In fact, it is found that the presence of sulfur trioxide in the gaseous mixture of reactants accelerates the reaction of the halogen with the organic material to a degree similar to that observed for the sulfonation reaction. As a result, when organic polymers are surface sulfonated in accordance with the foregoing conditions, it is observed that the surfaces of the polymer contain from about 0.04 to about 0.1 milliequivalent of halogen per milliequivalent of sulfur trioxide.

Following the sulfonation/halogenation reaction of the present invention, the reacted organic material may be employed as is or may be further neutralized with base or treated with epoxide or other reactant as is conventional to do.

The following examples are given to further illustrate a few embodiments of the invention and should not be construed as limiting its scope. In these examples, all parts and percentages are by weight unless otherwise indicated.

EXAMPLE 1

A film portion (3 cm×20 cm×0.06 mm) of polyethylene (density=0.959, melt index at 2.186 kg and 190° C.=1.5 decig/min) (Sample No. 1) is placed in a glass desiccator having an inlet and outlet for the passage of gas. The desiccator is evacuated to a pressure of 0.1 mm Hg and a gaseous mixture of reactants consisting of 19.7 volume percent of sulfur trioxide, 25 volume percent of chlorine, and a remaining amount of dry air is introduced into the desiccator in an amount sufficient to provide a pressure of 760 mm Hg. The gaseous mixture reactants are allowed to react with the polyethylene film at 25° C. for a period of about 5 minutes after which time a vacuum is pulled on the desiccator to remove excess $SO_3$ and chlorine. The polyethylene film is removed from the desiccator and neutralized by immersing it in a 2 percent aqueous ammonia solution and then dried. Then a portion of the neutralized film is removed and analyzed for percent sulfur and percent chlorine. The remaining film is tested for oxygen permeability and the results of the permeability and analysis are reported in Table I.

To further illustrate this invention, a film portion (3 cm×20 cm×0.06 mm) of another polyethylene (density=0.964, melt index=6 decig/min) (Sample No. 2) is similarly treated, analyzed and tested for oxygen permeability. The results of these tests are also reported in Table I.

For purposes of comparison, other samples of the aforementioned polyethylene films are subjected to conditions similar to the foregoing conditions except that the gaseous reactant mixture contains only chlorine and inert gas in one set of runs (Sample Nos. $A_2$ and $B_2$) and the gaseous mixture reactants contain only sulfur trioxide and inert gas in the other set of runs (Sample Nos. $A_1$ and $B_1$). The resulting films are analyzed for sulfur and chlorine and are tested for oxygen permeability. These results are also reported in Table I.

As evidenced by the data in Table I, high density polyethylenes are reacted to a higher degree of sulfonation and chlorination within a given time when a combined mixture of sulfur trioxide and chlorine are employed. Also as evidenced by the data, substantially greater barrier to oxygen is imparted when the gaseous mixture contains both sulfur trioxide and chlorine.

EXAMPLE 2

Using the high density polyethylene film as employed in Example 1 (Sample No. 1), a portion of the film (2 cm×20 cm×0.06 mm) is attached to a Quartz spring of a vacuum microbalance. Into an evacuated 5-liter flask is injected liquid $SO_3$, following vaporization of the liquid $SO_3$, dry air and chlorine are added to the 5-liter flask to provide an $SO_3$ vapor pressure of 62 mm Hg and a chlorine vapor pressure of 240 mm Hg. The resulting gaseous mixture becomes uniformly mixed by allowing the mixture to stand for a period of 10 minutes. This gaseous mixture is allowed to pass into the Quartz vacuum chamber of the microbalance containing the polyethylene film. The chamber was previously evacuated to a pressure of 0.1 mm Hg prior to entry of the gaseous reactant. During the reaction, the microbalance is maintained at a temperature of 25° C. Periodically the film weight is measured and the results are recorded in Table II.

Following the completion of the foregoing sulfonation run, the resulting sulfonated polyethylene film is removed and another unsulfonated sample of polyethylene film as employed in the preceding procedure is attached to the Quartz spring and sulfonated by the same procedure except that the chlorine vapor pressure is 480 mm Hg. Periodically the polyethylene film is weighed and the results are recorded in Table II.

For the purposes of comparison, another sulfonation run is carried out by the foregoing procedures except that no chlorine gas is introduced into the vacuum chamber and as a result the gaseous sulfonation reactant consists of sulfur trioxide and dry air wherein the sulfur trioxide vapor pressure is 62 mm Hg. The film sample is again weighed at predetermined intervals and the results are recorded in Table II.

TABLE I

| Sample No. | Gaseous Reactants[1] Type | Vol. % (mm Hg) | Analysis of Tested Film % S | % Cl | $O_2$ Permeability[2] cc/100 in$^2$/day/atm |
|---|---|---|---|---|---|
| 1 | $SO_3 + Cl_2$ | 19.7 + 25(150 + 190) | 1.9 | 0.08 | 1 |
| $A_1$* | $SO_3$ | 19.7(150) | 1.5 | 0 | 34 |
| $A_2$* | $Cl_2$ | 25(190) | 0 | 0.04 | 176 |
| $C_1$* | None | — | 0 | 0 | 190 |
| 2 | $SO_3 + Cl_2$ | 19.7 + 25(150 + 190) | 3.9 | 0.41 | 0.8 |
| $B_1$* | $SO_3$ | 19.7(150) | 2.2 | 0 | 3.3 |
| $B_2$* | $Cl_2$ | 25(190) | 0 | 0.17 | 690 |
| $C_2$* | None | — | 0 | 0 | 750 |

*Not an example of the invention
[1]Volume percent of particular reactant in gaseous mixture of reactants wherein any remaining amount is dry air.
[2]Oxygen permeation rate in cubic centimeters/100 square inches of film/24 hours at one atmosphere measured using a mass spectrometer to determine permeated oxygen at 20° C. for 24 hours.

TABLE II

| Sample No. | Gaseous Reactants Type/Pressure, mm Hg | Minutes | Weight Gain, mg/cm$^2$ 1 | 2 | 4 | 6 | 8 | 10 | 12 |
|---|---|---|---|---|---|---|---|---|---|
| 1 | $SO_3$/62 mm + $Cl_2$/240 mm | | 0.5 | 1.38 | 2.14 | 2.74 | Not Determined | | |
| 2 | $SO_3$/62 mm + $Cl_2$/480 mm | | 0.97 | 1.86 | 3.14 | 4.10 | Not Determined | | |
| $C_1$ | $SO_3$/62 mm | | 0.1 | 0.46 | 1.15 | 1.70 | 2.16 | 2.55 | 2.91 |
| $C_2$ | $Cl_2$/310 mm | | 0.024 | 0.029 | 0.034 | 0.039 | 0.044 | 0.50 | 0.54 |

As evidenced by the foregoing data, the presence of chlorine in a gaseous sulfonating agent accelerates the rate of sulfonation.

What is claimed is:

1. A process for sulfonating organic compounds which comprises contacting a sulfonatable organic compound which have hydrogen atoms bonded to carbon atoms which are replaceable by sulfonic acid groups with an essentially dry gaseous mixture comprising sulfur trioxide and suitably active halogen selected from the group consisting of fluorine, bromine, chlorine or mixtures thereof which inherently form interhalogen compounds, wherein the amount of sulfur trioxide is sufficient to provide a desired degree of sulfonation and the amount of halogen is sufficient to accelerate the rate of sulfonation at least 10 percent relative to the rate of sulfonation achieved by using sulfur trioxide in the absence of halogen.

2. The process of claim 2 wherein the mixture is a gaseous mixture of sulfur trioxide, chlorine and a dry gas inert to the sulfonation.

3. The process of claim 2 wherein the dry gas is dry air or nitrogen.

4. The process of claim 3 wherein the organic compound is a normally solid organic polymer.

5. The process of claim 4 wherein the polymer is a polymer of an α-olefin or a monovinylidene aromatic.

6. The process of claim 5 wherein the polymer is polyethylene.

7. The process of claim 6 wherein the amount of sulfur trioxide is from about 0.1 to 50 volume percent of the dry mixture and the amount of halogen is from about 0.1 to about 99 volume percent of the dry mixture.

8. The process of claim 6 wherein the amount of sulfur trioxide is from about 5 to about 20 volume percent of the dry mixture and the amount of halogen is from about 20 to about 80 volume percent of the dry mixture.

9. The process of claim 1 wherein the organic compound is a sulfonatable organic polymer.

10. The process of claim 9 wherein the polymer is an addition homopolymer or copolymer of one or more of the following monomers: aliphatic a-monoolefins, aliphatic conjugated and nonconjugated polyenes including dienes and trienes, halogenated aliphatic olefins, a,b-ethylenically unsaturated carboxylic acids, vinyl esters of nonpolymerizable carboxylic acids, alkyl esters of a,b-ethylenically unsaturated carboxylic acids, monovinylidene aromatic monomers, a,b-ethylenically unsaturated nitriles and other ethylenically unsaturated monomers which polymerize across the ethylenic bond to form polymers having a linear carbon to carbon backbone molecular structure of a plurality of free hydrogen atoms attached to the chain and/or attached to carbon atoms of substituents of the chain.

11. The process of claim 8 wherein the process is carried out at a sulfonation temperature in the range from about 10° to about 50° C.

* * * * *